US012248618B2

(12) United States Patent
Fernandez et al.

(10) Patent No.: US 12,248,618 B2
(45) Date of Patent: Mar. 11, 2025

(54) ENCRYPTED HUMAN INTERFACE KEYBOARD

(71) Applicant: Zingdoc Inc., New York, NY (US)

(72) Inventors: Clifford Fernandez, New York, NY (US); Kurt Grutzmacher, New York, NY (US); Derrick Harry Lewis, New York, NY (US)

(73) Assignee: Zingdoc Inc., New York, NY (US)

( * ) Notice: Subject to any disclaimer, the term of this patent is extended or adjusted under 35 U.S.C. 154(b) by 524 days.

(21) Appl. No.: 17/167,757

(22) Filed: Feb. 4, 2021

(65) Prior Publication Data

US 2022/0245287 A1 Aug. 4, 2022

(51) Int. Cl.

| | |
|---|---|
| ***G06F 21/83*** | (2013.01) |
| ***G06F 13/42*** | (2006.01) |
| ***G06F 21/60*** | (2013.01) |
| ***H04W 12/033*** | (2021.01) |

(52) U.S. Cl.

CPC .......... *G06F 21/83* (2013.01); *G06F 13/4282* (2013.01); *G06F 21/606* (2013.01); *H04W 12/033* (2021.01)

(58) Field of Classification Search

CPC ....... G06F 21/82; G06F 21/83; H04L 63/0838

See application file for complete search history.

(56) References Cited

U.S. PATENT DOCUMENTS

| | | | | |
|---|---|---|---|---|
| 7,243,237 | B2 * | 7/2007 | Peinado | G06F 21/83 713/181 |
| 8,572,684 | B1 * | 10/2013 | Sama | H04L 63/0838 726/4 |
| 8,868,927 | B1 * | 10/2014 | Lee | G06F 11/30 726/4 |
| 10,009,341 | B1 * | 6/2018 | Vieux | H04L 9/0863 |
| 10,291,599 | B2 * | 5/2019 | Haworth | G06F 21/83 |
| 2009/0066543 | A1 * | 3/2009 | Delia | G06F 21/85 341/23 |
| 2010/0023750 | A1 * | 1/2010 | Tan | G06F 21/82 713/150 |
| 2018/0337783 | A1 * | 11/2018 | Lu | H04L 63/083 |

* cited by examiner

*Primary Examiner* — Daniel B Potratz

(74) *Attorney, Agent, or Firm* — AMPACC Law Group, PLLC

(57) ABSTRACT

Systems and methods for sending and receiving communications securely between a human interface keyboard and a computer terminal are described. In some embodiments, the keyboard includes a human interface display and a processor to encrypt keystrokes entered by a user. Synchronization between the keyboard and the computer terminal is maintained by the devices, by encrypting and decrypting a signal according to the same randomized negotiated ASCII CharSet, which is generated by the computer terminal.

17 Claims, 5 Drawing Sheets

15
15a
15b
15c
20
10
25

ENCRYPTED HUMAN INTERFACE KEYBOARD

BACKGROUND

A keyboard allows a user to enter data into an electronic device, such as a desktop computer, laptop, or other computing device. The keyboard generates data (e.g., ASCII code) corresponding to a pressed key, and the data is received by a device driver of the electronic device. The device driver then passes the data to a program currently running on the electronic device.

One problem with a conventional keyboard is that it does not encrypt or otherwise keep secret the data it passes through to the computer. Current encryption strategies generally require additional equipment or systems, and can be inefficient to use in various secure environments.

In view of the foregoing, there is a need for a system that allows for secure communication with a keyboard.

Figure 1:
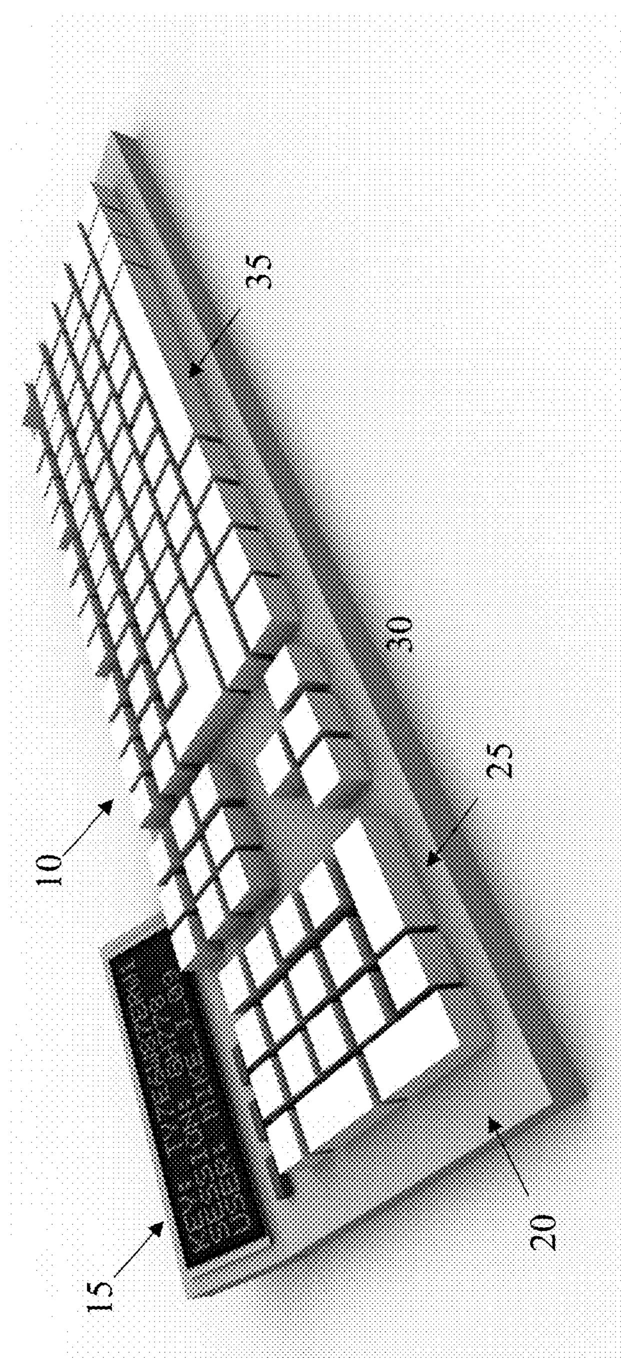
FIG. 1 is a diagram illustrating an encrypted human interface keyboard.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

Systems and methods that increase the security of computer terminal access are described. In some embodiments, the systems and methods include or are implemented by a keyboard and a computer terminal (e.g., a desktop computer, laptop, or mobile device). For example, the systems and methods are performed by a computer terminal that is connected to the keyboard via a serial connection.In some embodiments, the systems and methods, via a computing device, communicate with an associated keyboard, by: receiving, at the computing device, a signal from the keyboard, generating, at the computing device, a randomized keymap, and sending, from the computing device, session information data. The session information data includes first data that identifies the user, second data that identifies a communication session between the keyboard and the computing device, and third data that identifies the randomized key map. The keyboard then utilizes the randomized key map to encrypt keystroke data transmitted from the keyboard to the computing device during the communication session.

In some embodiments, the system for securely transmitting a communication between a keyboard and a computing device is a keyboard-based system, and includes a keyboard configured to receive keystroke input from a user. The keyboard includes one or more key switches each associated with a key contacted by the user during a keystroke, wherein the key switch is operable to generate a keystroke signal. Further, the keyboard includes a processor that encrypts generated keystroke signals according to a key map, and transmits the encrypted keystroke signals. The keyboard also includes a display device that displays session data associated with a communication session that includes the user, such as data that identifies the key map, the user, and the communication session.

As an example implementation of the encryption communication system described herein, a user, ready to operate a computer, first notifies the computer of a new communication session. To do so, the user may swipe an ID card at the computer and/or enter a user ID at the keyboard, or provide other input to identify the user. After the computer receives the activation notification and user ID, the computer generates a session token. The session token includes a User ID, Session ID, Key Code, and a negotiated ASCII Key Map (N-ASCII Key Map). The User ID identifies the user. The Session ID identifies the session. The Key Code identifies the N-ASCII Key Map that will be used for the session. For example, the N-ASCII Key Map is an encrypted and randomized N-ASCII Key Map to be used by the keyboard for the requested session.

The computer sends the session token to the keyboard, and the keyboard displays the User ID, Session ID, and Key Code via a visual user interface of the keyboard. The keyboard uses the N-ASCII Key Map to output or transmit, to the computer, an encrypted keystroke signal, based on each keystroke performed by the user via the keyboard. The computer then receives the encrypted key signals and displays corresponding symbols (e.g., text) onto the computer screen or display, or otherwise present the symbols to the user. After the user completes the session, the user sends a session end notification to the computer. The session end notification may be based on actions of the user, such as the user logging out or removing an ID from the computer terminal.

In the following description, for the purposes of explanation, numerous specific details are set forth in order to provide a thorough understanding of implementations of the present technology. It will be apparent, however, to one skilled in the art that implementations of the present technology can be practiced without some of these specific details. The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

Examples of the Encryption System

As described herein, the systems and methods provide a method of secure communication transmission between a keyboard and an associated computer terminal. The systems and methods include keyboard-based components, enabling the keyboard to control or be associated with securing communications between devices that result from input (e.g., keystrokes) received via the keyboard.

FIG. 1 discloses a keyboard 10, such as a keyboard configured to secure communications input to the keyboard. The keyboard 10 includes a key layout secured to a keyboard base 20. In some embodiments, the layout includes at least an input keys section 35, a keypad section 25, and arrow keys 30. Of course, the keyboard 10 can include other key layouts, including multiple or different sections of input keys or command keys, as well as more or fewer leys within each section. The keyboard 10 also includes a display 15. The display 15 may be a liquid crystal display (LCD) or any other device utilizing suitable display technology to present information to a user.

Figure 2:
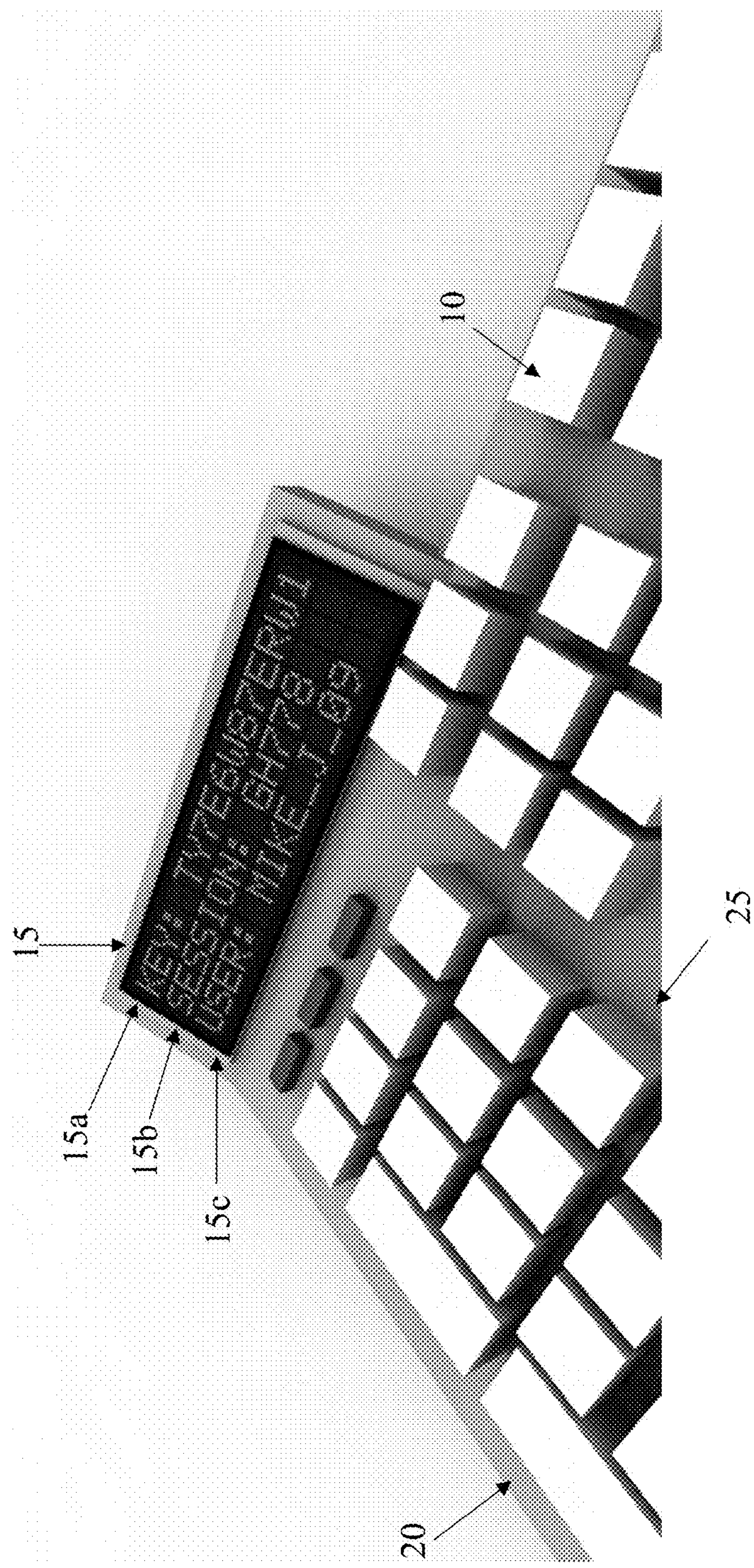
FIG. 2 is a diagram illustrating a display device of the encrypted human interface keyboard.

FIG. 2 illustrates the display 15 of FIG. 1. The display 15 may present various information, including, but not limited to, a Key ID 15*a*, a Session ID 15*b*, and a User ID 15*c*. The display 15 can be securely fastened to the base 20 of the keyboard 10. The display 15 may be placed above the keypad section 25 of the keyboard 10. Of course, the display 15 can be positioned proximate to other sections of the keyboard 10, and/or can be integrated into the keyboard base 20. Further, the display 15 may present other information associated with a communication sessions, such as session duration information, other user or session identifiers, other key identifiers, and so on.

Figure 3:
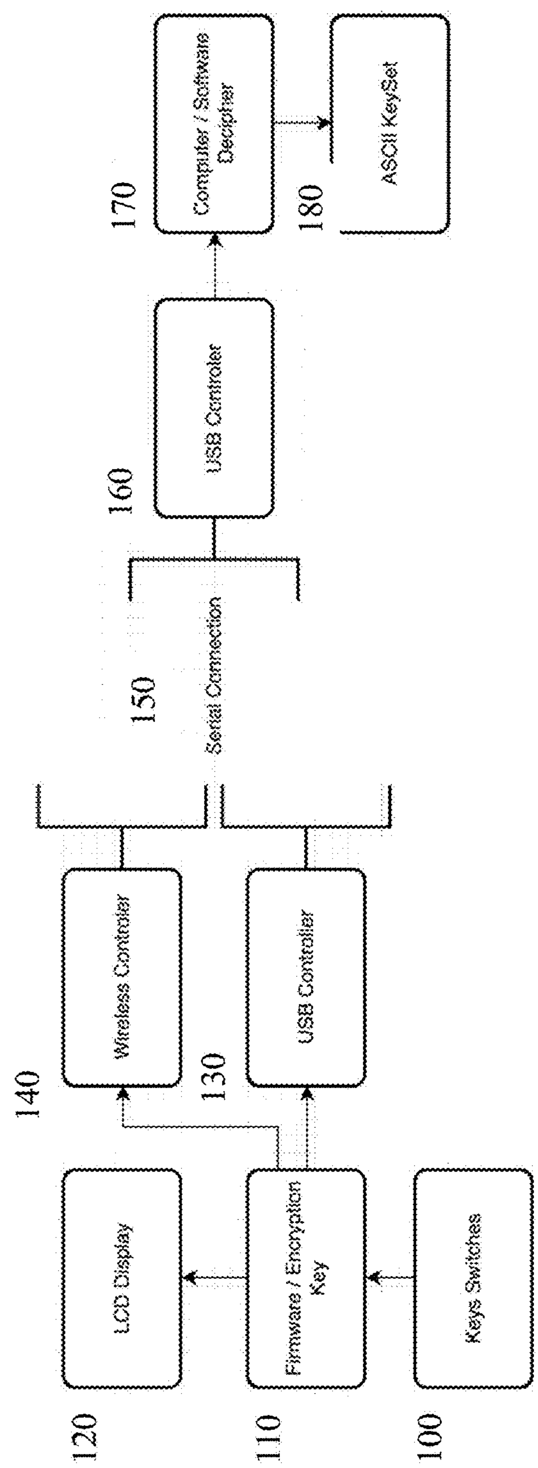
FIG. 3 is a block diagram illustrating components of an encryption communication system.

FIG. 3 illustrates components of the keyboard-based encryption communication system, which performs or facilitates encrypted communications between the keyboard 10 and a computer. The keyboard 10 includes key switches 100, firmware 110, the display 120, a USB controller 130, and a wireless controller 140. A USB controller 160, a decipher component 170, and an ASCII keyset 180 are disposed on the computer associated with the keyboard 10. In some embodiments, the display 120, such as display 15, presents various information to the user. The displayed information may include the key ID 15*a*, the Session ID 15*b*, and/or the User ID 15*c*, as shown in FIG. 1. As described herein, the display 120 may be an LCD screen or some other suitable display device.

During operation, a user may interact with the key switch 100 (e.g., contact a key associated with the keyswitch 100) to generate keystroke data. The keystroke data is received by a keyboard processor (not shown). The keyboard processor operates according to the firmware 110, which includes or stores an encryption key. The processor translates the keystroke data into encrypted keystroke data using the encryption key. In some embodiments, the encryption key is a Negotiated ASCII Keymap (N-ASCII Keymap) previously sent by the computer to the keyboard 10 for use in the particular session.

The encrypted keystroke data is then sent to the computer 170 via a serial connection 150 between the keyboard 10 and the computer 170. For example, the transmission of the keystroke data may be via a wired or wireless connection. When data is to be transmitted via hardwire, the input data is sent through the wired USB controller 130. However, when the input data is transmitted from the keyboard 10 to the computer 170 via a wireless connection, the keyboard 10 utilizes the wireless controller 140.

The computer receives the encrypted keystroke data sent via the serial connection 150 at the controller 160. The encrypted keystroke data is then sent to a software decipher component 170 for decryption. After the keystroke is decrypted, it is mapped using an associated ASCII KeySet, and the correct, or mapped, character is displayed on the computer's display device, viewable by the user. In some cases, the keymap dechipher is randomly generated by the computer, such as when or after the user is authenticated with or by the system keymap (and the decipher is then randomly generated). In other cases, the keymap can also be randomized by or after every keystroke.

FIGS. 1-3 and the discussion herein provide a brief, general description of the components of the keyboard 10 and encrypted communication system. Although not required, aspects of the system are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network.

Examples of the Encrypted Keyboard Communication System

As described herein, the encyrption communication system utilizes multiple encryption methods when performing secure communications between a keyboard and a computer.

Figure 4:
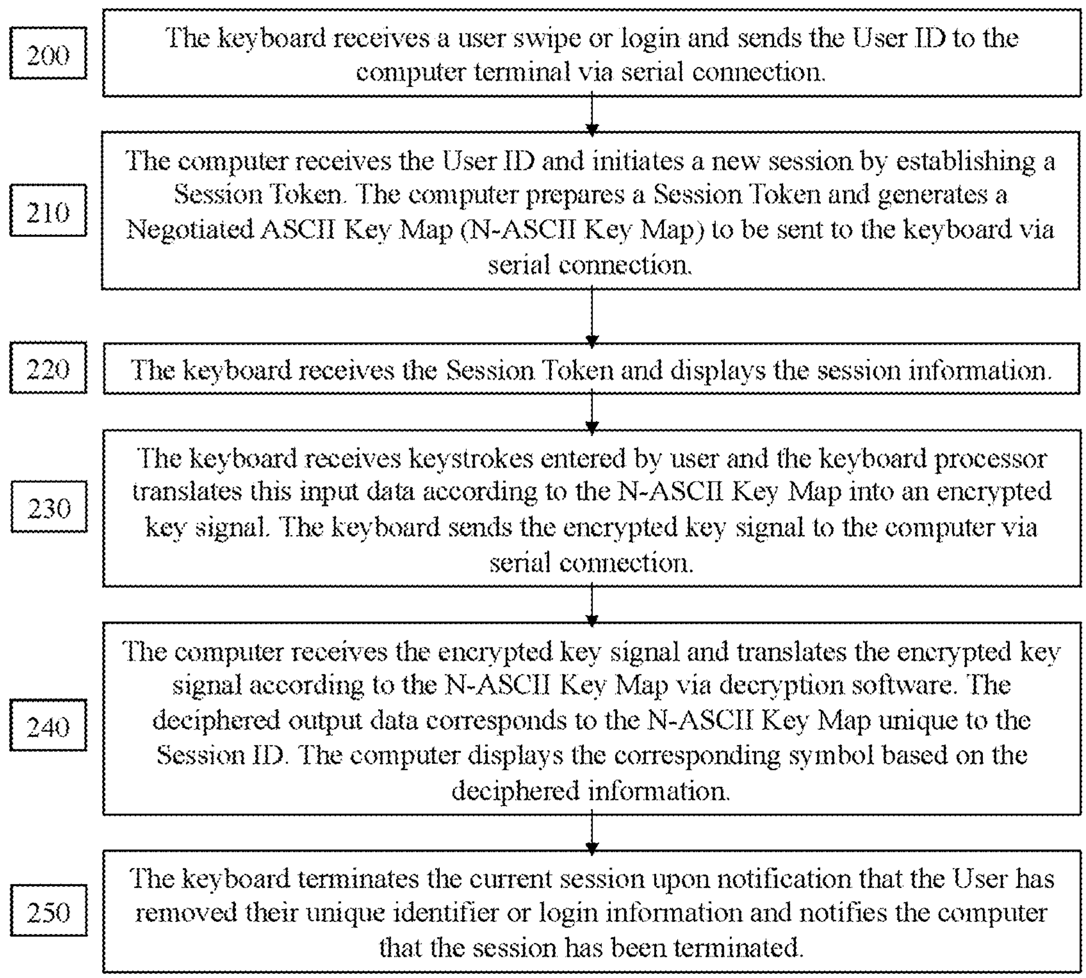
FIG. 4 is a flow diagram illustrating a method of performing encrypted communications between a keyboard and a computer terminal.

FIG. 4 illustrates a method for securing communications between a keyboard and a computer. Aspects of the method may be performed by the keyboard 10 or computer and, accordingly, is described herein merely by way of reference thereto. It will be appreciated that the method may be performed on any suitable hardware.

According to FIG. 4, the method is activated at the keyboard. At operation 200, a user enters a unique identifier at a keyboard to initiate a session. The unique identifier may be any information that is capable of identifying a specific user, for example, an ID card or username and password. The information associated with the unique identifier is read by the keyboard processor, and is displayed on a user interface on the keyboard. The user interface may be the display 15, as depicted in FIG. 1, such as an LCD screen, a series of LEDs, or any other display devices.

As described herein, the keyboard 10 may transmit the User ID to the computer terminal via either of two controllers, the first controller 130 and the second controller 140 (collectively, "the controllers"). The controllers 130 and 140, are connected via the serial connection 150 either in a wired or wireless manner.

In operation 210, the computer receives the User ID from the keyboard and initiates a new session. For example, the computer terminal creates a new session by generating a Session Token, which may include a Key ID, Session ID, and a User ID. Further, during operation 210, the computer generates a random N-ASCII Key Map, and the N-ASCII Key Map is transmitted from the computer terminal to the keyboard.

In operation 220, the keyboard 10 receives the Session Token, and displays the Session Token on the user interface of the keyboard 10. Then, in operation 230, the keyboard receives keystrokes, or input data, entered by the ser. The input data is translated by the keyboard processor (not shown) according to the N-ASCII Key Map to generate an encrypted key signal. The keyboard sends the encrypted key signal to the computer via the serial connection 150. When the data is to be transmitted via the serial connection 150 via hardwire, the input data is sent through the wired USB controller 130. However, when the input data is transmitted from the keyboard 10 to the computer via a wireless connection, the system utilizes the wireless controller 140.

In operation 240, the computer receives the encrypted key signal and translates the encrypted key signal according to the N-ASCII Key Map via decryption software. The deciphered output data corresponds to the N-ASCII Key Map that is unique to the Session ID. The computer displays the corresponding symbol based on the deciphered output data at the computer terminal. In operation 250, the computer terminates the session. Termination occurs when the computer terminal receives notification that the user terminated the session. The session may be terminated by the user, for example by removing an identification card or logging out of the apparatus' software.

Figure 5:
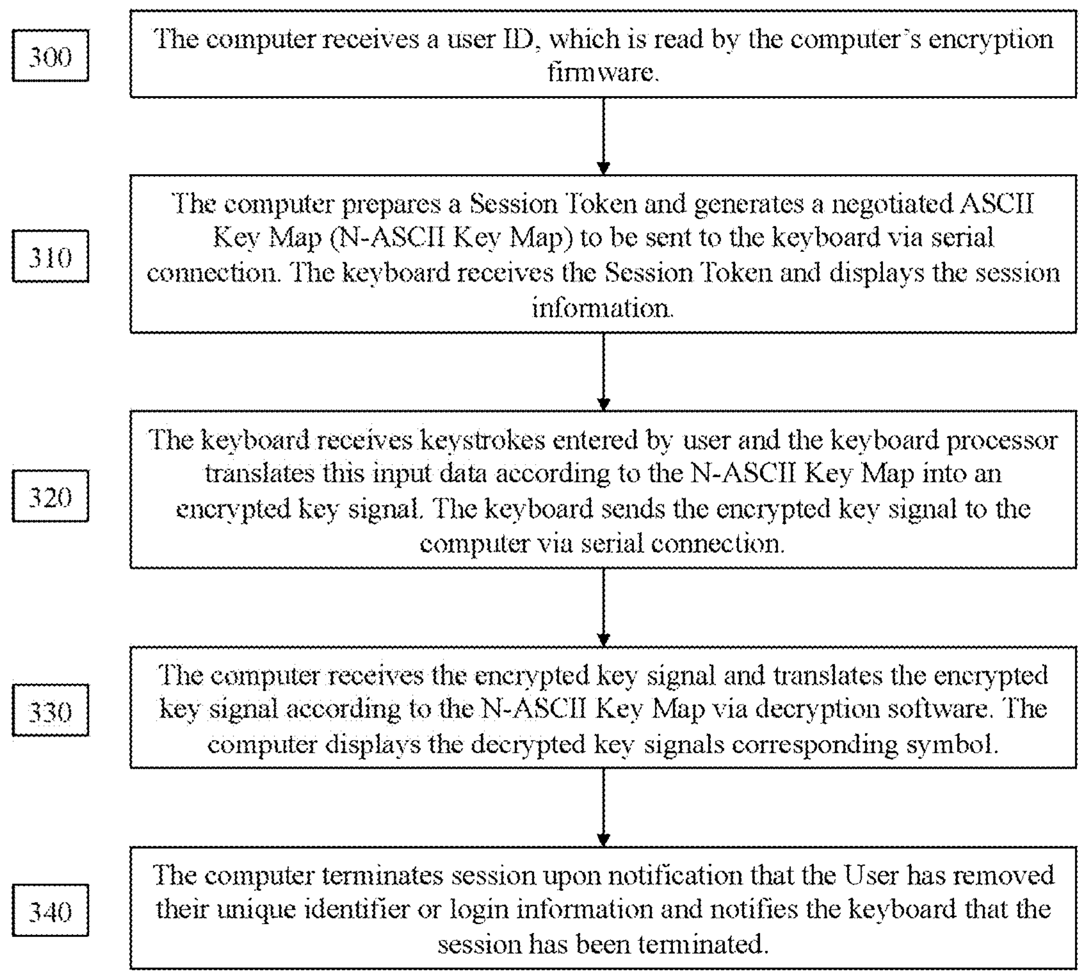
FIG. 5 is a flow diagram illustrating another method of encrypted communications between the keyboard and a computer terminal.

FIG. 5 illustrates another method for securing communications between a keyboard and a computer. Aspects of the method may be performed by the keyboard 10 or computer and, accordingly, is described herein merely by way of reference thereto. It will be appreciated that the method may be performed on any suitable hardware.

In operation 300, the computer receives a User ID, which is read by the computer's encryption firmware at the computer terminal. In operation 310, the computer prepares a Session Token and generates a Negotiated ASCII Key Map (N-ASCII Key Map) to be sent to the keyboard via the serial connection 150. After the computer associates the N-ASCII Key Map and the User ID, the keyboard 10 receives the Session Token and displays the session information. The communication then begins when the keyboard 10 receives keystrokes from the user in the form of input data. The input data may include letters, numbers, or a different arrangement of symbols.

In operation 320, the keyboard 10 receives the keystrokes, and the keyboard processor translates the input data according to the N-ASCII Key Map into an encrypted key signal. The keyboard sends the encrypted key signal to the computer terminal via the serial connection 150.

In operation 330, the computer receives the encrypted key signal and translates the key signal according to the N-ASCII Key Map via decryption software. Once the encrypted key signal is translated, the decrypted key signal is displayed at the computer terminal. In operation 340, the secure connection is terminated upon notification from the computer indicating that the user has ended the session. As described herein, there are multiple ways to terminate a session; for example, a session may be terminated upon the user logging out of the computer terminal, or if the user removes an identification card from the computer terminal. After the computer receives notification that the session has been terminated, the computer notifies the keyboard 10 that the session has been discontinued.

In some cases, once there is a disconnection with the terminal and any invalid ASC key sent without a valid session, the map on the computer system is randomly shuffled upon sending a request. Thus, the system can avoid or prevent someone from determnining a pattern by hitting a bunch of keys, as the pattern changes with every input key stroke.

Conclusion

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the disclosure(s) set out in any claims that may issue from this disclosure. Specifically, and by way of example, the claims should not be limited by the language chosen under a heading to describe the so-called technical field. Further, a description of a technology in the "Background" is not to be construed as an admission that technology is prior art to any embodiment(s) in this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

The teachings of the methods and system provided herein can be applied to other systems, not necessarily the system described above. The elements, blocks and acts of the various implementations described above can be combined to provide further implementations.

Any patents, applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

We claim:

1. A system for securely transmitting a communication between a keyboard and a computing device during a communication session, the system comprising:

the keyboard, which is configured to receive keystroke input from a user, the keyboard including:

one or more key switches each associated with a key contacted by the user during a keystroke, wherein a key switch is operable to generate a keystroke signal;

a processor operable to:

receive, from the computing device, a session token associated with the communication session that identifies a session ID for the communication session and a key map specific to the communication session, encrypt generated keystroke signals according to the key map, and transmit the encrypted keystroke signals; and a display device operable to display session data associated with the communication session that includes the user, wherein the displayed session data includes data identifying the key map, data identifying the user, and data identifying the session ID for the communication session.

2. The system of claim 1, wherein the computing device includes:

a processor operable to decrypt the encrypted keystroke signals transmitted from the keyboard to the computing device using the key map; and a display device operable to display the decrypted keystroke signals.

3. The system of claim 1, wherein the key map is a randomized ASCII key map.

4. The system of claim 1, wherein the keyboard transmits the encrypted keystroke signals to the computing device over a wired serial connection.

5. The system of claim 1, wherein the keyboard transmits the encrypted keystroke signals to the computing device over a wireless serial connection.

6. The system of claim 1, wherein the keyboard is a physical keyboard in serial communication with the computing device.

7. The system of claim 1, wherein the session data includes a key ID, the session ID, and a user ID.

8. The system of claim 1, wherein the processor accesses the key map via firmware contained by the keyboard.

9. The system of claim 1, wherein the processor is configured to:

transmit the data identifying the user to the computing device; and receive the session token from the computing device that is based on the data identifying the user, wherein the session token includes the session data.

10. The system of claim 1, wherein the processor is configured to:

transmit the data identifying the user to the computing device; and receive a session token from the computing device that is based on the data identifying the user, wherein the session token includes the session data.

11. A keyboard, comprising:

one or more key switches each associated with a key that is contacted by a user during a keystroke, wherein a key switch is operable to generate a keystroke signal;

a processor operable to:

receive, from a computing device associated with the keyboard, a session token associated with a communication session for the user, wherein the session token identifies a session ID for the communication session and a key map specific to the communication session, encrypt generated keystroke signals according to the key map, and transmit the encrypted keystroke signals to the computing device associated with the keyboard; and a display device operable to display session data associated with the communication session that includes the user of the keyboard, wherein the displayed session data includes data identifying the key map, data identifying the user, and data identifying the session ID for the communication session.

12. The keyboard of claim 11, wherein the key map is a randomized ASCII key map.

13. The keyboard of claim 11, wherein the keyboard is configured to transmit the encrypted keystroke signals to the associated computing device over a wired serial connection.

14. The keyboard of claim 11, wherein the keyboard is configured to transmit the encrypted keystroke signals to the associated computing device over a wireless serial connection.

15. The keyboard of claim 11, wherein the keyboard is a physical keyboard in serial communication with the computing device.

16. The keyboard of claim 11, wherein the session data includes a key ID, the session ID, and a user ID.

17. The keyboard of claim 11, wherein the processor accesses the key map via firmware contained by the keyboard.

* * * * *